United States Patent
Doron et al.

(10) Patent No.: US 10,033,758 B2
(45) Date of Patent: Jul. 24, 2018

(54) SYSTEM AND METHOD FOR OPERATING PROTECTION SERVICES

(71) Applicant: RADWARE, LTD., Tel Aviv (IL)

(72) Inventors: Ehud Doron, Moddiin (IL); Alon Tamir, Kiryat Ono (IL); Gershon Sokolsky, Holon (IL); Asaf Oron, Even-Yehuda (IL); Yotam Ben-Ezra, Raanana (IL); David Aviv, Tel Aviv (IL)

(73) Assignee: Radware, Ltd., Tel Aviv (IL)

(*) Notice: Subject to any disclaimer, the term of this patent is extended or adjusted under 35 U.S.C. 154(b) by 0 days.

(21) Appl. No.: 15/483,375

(22) Filed: Apr. 10, 2017

(65) Prior Publication Data

US 2017/0214713 A1    Jul. 27, 2017

Related U.S. Application Data

(63) Continuation-in-part of application No. 14/640,814, filed on Mar. 6, 2015, now Pat. No. 9,769,201.

(60) Provisional application No. 62/322,556, filed on Apr. 14, 2016.

(51) Int. Cl.
*H04L 29/06* (2006.01)
*H04L 12/911* (2013.01)

(52) U.S. Cl.
CPC .......... *H04L 63/1458* (2013.01); *H04L 63/14* (2013.01); *H04L 63/1416* (2013.01); *H04L 47/726* (2013.01); *H04L 2463/141* (2013.01)

(58) Field of Classification Search
CPC . H04L 63/1458; H04L 63/14; H04L 63/1416; H04L 47/726; H04L 2463/141
See application file for complete search history.

(56) References Cited

U.S. PATENT DOCUMENTS

| | | | |
|---|---|---|---|
| 2005/0131993 A1* | 6/2005 | Fatula, Jr. | G06F 9/5072 709/202 |
| 2006/0277409 A1* | 12/2006 | Galwas | G06F 21/6209 713/176 |

* cited by examiner

*Primary Examiner* — Meng Li
(74) *Attorney, Agent, or Firm* — M&B IP Analysts, LLC

(57) ABSTRACT

A method and system for operating protection services to provide defense against cyber-attacks. The comprises generating a workflow scheme assigned to at least one protected entity, wherein the workflow scheme includes at least one operation regimen and triggering criteria associated with the at least one operation regimen; monitoring at least a plurality of protection resources to detect at least one trigger event; determining if the at least one detected trigger event satisfies the triggering criteria associated with the at least one operation regimen; and changing a state of the at least one operation regimen when the at least one detected trigger event satisfies the at least one triggering criterion, thereby causing provisioning and operating of at least one protection resource of the plurality of protection resources, wherein the provisioning is based on contents defined in the at least one operation regimen.

21 Claims, 11 Drawing Sheets

SYSTEM AND METHOD FOR OPERATING PROTECTION SERVICES

CROSS-REFERENCE TO RELATED APPLICATIONS

This application claims the benefit of U.S. provisional application No. 62/322,556 filed on Apr. 14, 2016. This application is also a continuation-in-part of U.S. patent application Ser. No. 14/640,814 filed on Mar. 6, 2015. The contents of the above-noted applications are hereby incorporated by reference.

TECHNICAL FIELD

This disclosure generally relates to techniques for provisioning of cyber-attack mitigation and detection devices deployed in communication networks.

BACKGROUND

With the increasing use of computers in modern society, computer systems have become increasingly subject to cyber-attacks intended to disrupt the systems and/or steal data. Accordingly, the field of cyber security has developed to combat such cyber-attacks. Cyber security is particularly important in networked systems, where multiple computer resource interact to provide sharing of, for example, files and applications. Each networked system may require different cyber security resources in order to be effectively covered. Accordingly, many networking system owners choose to deploy customized cyber security measures to combat potential threats to their particular systems. Even more imperative, these particular customizations are needed in order to meet the overall structure and architecture of their networks, and the operations challenges they have. These requirements and corresponding measures may be more significant in large scale networks for communicating among numerous resources.

The properties and architecture of communication networks pose certain challenges in protecting the network's resources against cyber threats, in particular denial of service (DoS) and distributed DoS (DDoS) attacks. The challenges result from the many resources and services included in such a network, collaboration between resources, and the dynamic, and complex, services provided by such networks. The complexity of cyber-attacks plays a major role here as DoS/DDoS attack campaigns are more sophisticated and aggressive. To defend against such threats, security resources are deployed in the communication networks. The security resources include detection devices for detecting potential attacks/threats and mitigation devices to mitigate detected attacks.

Existing solutions face further challenges in provisioning and managing the security resources, particularly in large scale networks. To combat the increasing cyber security threats, organizations incorporate various security systems into their networks. The incorporation of multiple security resources increases the complexity of the network. As a result, these organizations face significant amounts of manual configuration and/or tuning for appropriate responses. Such configuration and tuning is very complicated, time and labor intensive, and may be unrealistic when faced with increasingly adaptive threats and/or increasingly changing networks.

Specifically, the particular requirements of each organization deploying a network may require significant customization of security solutions therefor. To this end, an organization may seek to develop, or deploy, customized security resources meeting its particular needs. Many vendors providing such security solutions seek to include as many features as possible to be able to fit the various needs, and customizations, of the maximum number of organizations. However, such overinclusion of features results in overcomplicated security systems that are not easy to manage. As a result, these overcomplicated security systems are not particularly flexible and, therefore, cannot be readily reconfigured to changes in needs. These issues are further exacerbated in larger scale networks.

In addition, due to the complexity of the networks and the ample number of different security systems, security resources, and/or techniques that can be utilized, manual configuration of such resources is prone to errors by a user (e.g., a system administrator). For example, such a user may be reluctant to capture all possible scenarios to detect and/or mitigate a potential cyber-attack and/or to define all objects that should be protected. Such misconfiguration would result in an unsecure protected environment.

Additionally, manual configuration cannot be rapidly adapted to capture DDoS burst attacks. The DDoS burst attack durations are shorter, i.e., attack campaigns have been characterized by short bursts of DDoS attacks which indicate automated coordination by the attackers. Thus, the security resources in the network should be configured or provisioned to mitigate such attacks. A manual provisioning, however, cannot achieve such rapid reconfiguring. Rather, the user may not even be aware of the issue until most or all of the damage has been done.

It would therefore be advantageous to provide a solution that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include a method for operating protection services to provide defense against cyber-attacks. The method comprises generating a workflow scheme assigned to at least one protected entity, wherein the workflow scheme includes at least one operation regimen and triggering criteria associated with the at least one operation regimen; monitoring at least a plurality of protection resources to detect at least one trigger event; determining if the at least one detected trigger event satisfies the triggering criteria associated with the at least one operation regimen; and changing a state of the at least one operation regimen when the at least one detected trigger event satisfies the at least one triggering criterion, thereby causing provisioning and operating of at least one protection resource of the plurality of protection resources, wherein the provisioning is based on contents defined in the at least one operation regimen.

Certain embodiments disclosed herein include a system for operating protection services to provide defense against cyber-attacks. The system comprises a processing circuitry; and a memory, the memory containing instructions that, when executed by the processing circuitry, configure the system to: generate a workflow scheme assigned to at least one protected entity, wherein the workflow scheme includes at least one operation regimen and triggering criteria associated with the at least one operation regimen; monitor at least a plurality of protection resources to detect at least one trigger event; determine if the at least one detected trigger event satisfies the triggering criteria associated with the at least one operation regimen; and change a state of the at least one operation regimen when the at least one detected trigger event satisfies the at least one triggering criterion, thereby causing provisioning and operating of at least one protection resource of the plurality of protection resources, wherein the provisioning is based on contents defined in the at least one operation regimen.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
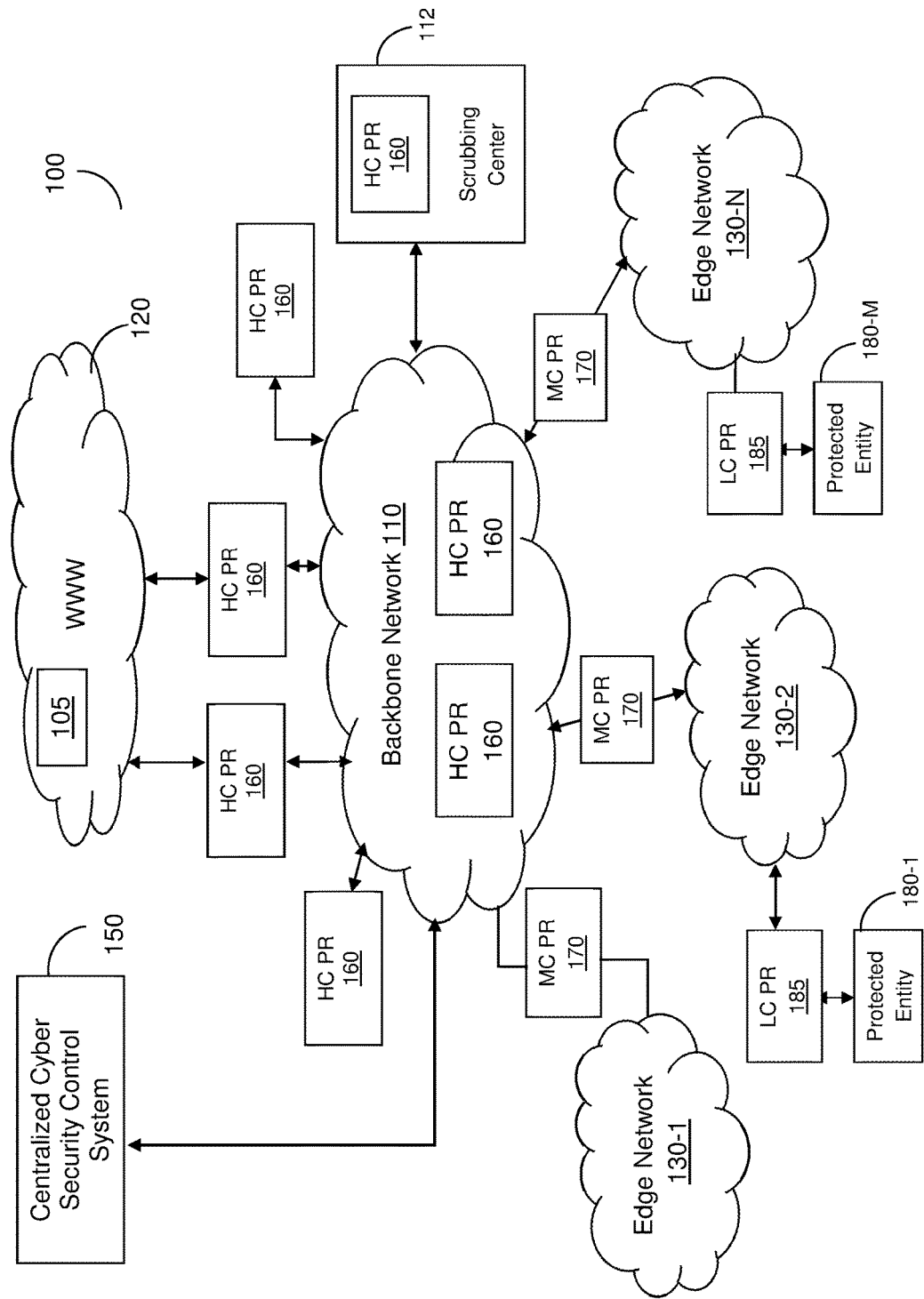
FIG. 1 illustrates a diagram of a network utilized to describe the various disclosed embodiments.

The embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an example diagram illustrating a topology of a network 100 utilized to describe the various embodiments disclosed herein. The network 100 includes a backbone network 110 connected to the World Wide Web (WWW) 120 and to a plurality of edge networks 130-1 through 130-N (collectively referred to hereinafter as edge networks 130 or individually as an edge network 130). The backbone network 110 may be operated or maintained by an Internet service provider (ISP) or other service provider, a network carrier, a cloud provider, and the like. The edge network 130 may be a datacenter, an enterprise network, a small medium business (SMB) network, and the like. The edge network 130 allows access to a plurality of computing resources (not shown). In one example embodiment, such computing resources are realized as virtual machines connected to a load balancer, an application delivery controller, and the like.

A virtual machine (VM) is a software implementation of a computer that executes programs in a way that is similar to a physical machine. The virtualization technology allows the sharing of the underlying physical hardware resources between different virtual machines in an isolated manner. The isolation and independence of VMs allow for creation of "tenants" and for provision of multi-tenancy support in an edge network 130. A "tenant" is a group of one more VMs hosted in a physical machine and provisioned to provide services to a particular customer, for example, based on a service-level agreement (SLA). Virtualization further provides a high level of dynamics for creating, deleting, and powering on/off, added or removed from their physical machines. The disclosed security embodiments account for such dynamic challenges.

In certain optional configurations, the backbone network 110, any of the edge networks 130, or both, can be realized as a software defined network (SDN). The SDN allows for building a networking architecture that provides centralized management of network elements rather than a distributed architecture utilized by conventional networks. Typically, in a SDN, a network element follows networking operations, such as routing decisions received from a central controller (not shown).

In one configuration of a SDN, the central controller communicates with the network elements using an OpenFlow protocol, which provides a network abstraction layer for such communication. The OpenFlow protocol, and similar protocols, allows for adding programmability to network elements for the purpose of packets-processing operations under the control of the SDN central controller, thereby allowing the SDN central controller to define the traffic handling decisions in the network element. To this end, traffic received by a network element that supports the OpenFlow protocol is processed and routed according to a set of rules defined by the SDN central controller. In another embodiment, the backbone network 110, any of the edge networks 130, or both, can be realized using other network control functionalities, such as the BGP and BGP FlowSpec and similar. It should be emphasized that the SDN central controller is included only in SDN configurations.

Securing the protected entities is facilitated by using a plurality of protection resources deployed in the network. The protection resources may include, but are not limited to, at least one detector for detecting potential and on-going DDoS attacks and at least one mitigator for mitigating detected attacks. In some implementations, any configurable network element (e.g., a router, a firewall, IDS/IPS, etc.) can be integrated in a protection resource. As one example, a router can be utilized to block or rate lime the attack traffic. The protection resources (PRs) demonstrated in FIG. 1 are labeled as HC PR 160, MC PR 170, and LC PR 185. As will be discussed below, the resources may be configured with different capacities, each of which is configured to handle different traffic bandwidth associated with the cyber-attacks.

In some configurations, the network 100 may be configured as a large-scale network, where a plurality of defense tiers may be defined and are controlled by a centralized cyber security control system 150 (hereinafter "security control system 150"). The protection resources 160, 170, and 185 are communicatively connected to the security control system 150. In an example embodiment, the following defense tiers may be defined; a cloud-tier (tier-0); a backbone-tier (tier-1), an edge-tier (tier-2), and an entity-tier (tier-3). The cloud-tier (tier-0) includes a scrubbing center 105 operable or communicatively connected in the WWW 120. The cloud based scrubbing center 105 is configured to clean high volumes of malicious traffic that typically cannot be efficiently handled by resources of the backbone network 110.

The backbone-tier (tier-1) includes high capacity (HC) protection resources (collectively refer to as high capacity protection resources 160) deployed in the backbone network 110. The high capacity protection resources 160 of the tier-1 include high capacity of detection and mitigation resources. The high capacity protection resources 160 are mainly configured to handle network layer attacks without limitation to the protected backbone network 110 (otherwise referred to as infrastructure protection), for example detection, mitigation, or both, of DoS/DDoS at the network (layer-4) layer. Along with Layer-4 detection and mitigation, the high capacity protection resources 160 can also handle Layer-7 based attacks.

It should be noted that the capacity of a protection resource does not relate only to the amount of traffic that the protection resource can process, but also to mitigation and detection capabilities (generally referred to as "security capabilities") that such a resource is configured with. For example, one protection resource can be configured with advanced challenges to detect bots, while another protection resource cannot perform any challenges.

In some embodiments, the high capacity protection resources 160 can be deployed in different locations in the backbone network 110 such as, but not limited to, peers of the backbone network 110, scrubbing centers 112, or both. A scrubbing center 112 may be a global or a regional scrubbing center. Typically, suspicious traffic is passed or diverted through a scrubbing center 112, which performs one or more mitigation actions on the incoming traffic and forwards legitimate clean traffic back to the backbone network 110.

The deployment mode of a high capacity and high security capabilities protection resource 160 may be, for example, inline, out of path (OOP), local out of path (LOOP), or in-device (e.g., a mitigation device that is embedded in another networking element, such as a switch or router). In a non-limiting embodiment, any high capacity protection resource 160 can act as a security server that detects large-scale DoS/DDoS attacks, mitigates large-scale DoS/DDoS attacks, or both, as detailed, for example, in U.S. Pat. No. 8,832,831 and U.S. patent application Ser. No. 13/306,360, assigned to the common assignee, which are hereby incorporated by reference.

The edge-tier (tier-2) is designed to the various edge networks 130 through the medium capacity (MC) protection resources (collectively refer to as medium capacity protection resources 170) deployed inline or OOP between the backbone network 110 and the respective edge networks 130-N. The medium capacity protection resources 170 are configured to detect, mitigate, or both, DoS/DDoS attacks at the application layer (layer-7), the network layer (layer 4), or both, per customer network.

The entity-tier (tier-3) secures the protected entities 180-1 through 180-M (collectively referred to hereinafter as protected entities 180 or individually as a protected entity 180) connected to the edge networks 130. The protected entity 180 may be a tenant, a computing infrastructure, a server or group of servers, a service, or a combination thereof. Typically, the protected entity 180 is associated with a customer paying for the security services. A protected entity 180 may be configured by an IP address for protection of a dedicated server (for example, a single VM), by a variable size subnet for a network protection (a group of VMs), or by ASN, BGP Community, FQDN, URI, E.164 number, and the like. The protected entity 180, in an embodiment, can be a server, or a group of servers, deployed in any of the backbone network 110, the edge network 130, or both.

This entity-tier (tier-3) typically includes low capacity (LC) protection resources (collectively referred to as low capacity protection resources 185). The low capacity protection resources 185 are configured to detect DoS/DDoS attacks, to mitigate DoS/DDoS attacks, or both, at the application layer (layer-7), at the network layer (layer 4), or both, per a protected entity (e.g., a tenant or customer). This allows for implementing security mechanisms per a specific network location, tenant, and the like. The specific security mechanism to be utilized may be determined by a security policy. It should be noted that typically each of the tier-2 and tier-3 include an aggregation of resources that provide high capacity resources.

It should be noted that the low, medium, or high capacity protection resources are utilized only between the different resources and determine their capacity of resource relative to each other. It should be further noted that a protection resource can be a virtual machine, a physical machine, or combination thereof. In an embodiment, when the protection resource is a virtual machine, the capacity of each protection resource can be increased.

In some configurations, the low capacity protection resources 185 can be deployed as an application layer (virtual) in inline, LOOP, in-device, or in a virtual appliance (in-server). In certain implementations, a low capacity protection resource 185 can be provisioned with lower security capabilities and can even act as a probe device for attack detection purposes only. In such implementations, a low capacity protection resource 185 acting as a probe is directly connected to a protected tenant (e.g., a VM). When an attack is detected by the detection device probe, the low capacity protection resource 185 signals an attack indication along with attack details to the security control system 150. In response, the security control system 150, upon receiving such an indication, selects one or more of the protection resources 160 and 170 to mitigate the attack. As will be discussed in more detail below, the protection resource or resources 160, 170, and 185 can be selected from any defense tier defined in the network 100.

Specifically, according to the disclosed embodiments, the security control system 150 is configured to dynamically control the protection resources 160, 170, and 185 to allow for efficient detection and mitigation of attacks across tiers in the network 100. To this end, the security control system 150 ensures maximum utilization and best usage of each protection resource in the network 100 at any attack scale.

In another embodiment, the security control system 150 is configured to control the network elements to divert traffic to one or more scrubbing centers 112 deployed in tier-1 or to a scrubbing center 105 deployed in tier-0. In an embodiment, the traffic diversion can be performed by means of an SDN central controller when the network 100 includes at least one SDN. In another embodiment, the traffic diversion can be performed by means of the BGP FlowSpec protocol.

The primary selection of the optimal tier or tiers to mitigate an on-going attack is based on a plurality of parameters related to the existing load, and operational status, of the protection resources 160, 170, and 185, security capabilities provisions of the protection resources, attack scale, load of network resources, SLA guaranteed to protected customers, tenants to be protected, and so on. It should be noted that, in certain implementations, the functionality of the security control system 150 can be integrated in an SDN central controller.

In certain example embodiments, the security control system 150 is set up with the topology of the large-scale network 100. Specifically, the security control system 150 is configured with the properties of each resource 160, 170, and 185. Such attributes include, but are not limited to, an identifier, a network address (e.g., IP address), a location within the network (i.e., at the network 110, the edge network 130, at a protection entity 180, and so on), the security (mitigation/detection) capabilities, and so on. In an embodiment, the configuration data can be obtained from the SDN central controller, from external management or orchestration systems, or both.

According to the disclosed embodiments, the centralized security control system 150 actively monitors the state of each resource in the various defense tiers defined above. To this end, the system 150 is configured to provide flexible responses to possible cyber security threats, and other various events like network events (connectivity changes, resource utilization issues), based on predetermined selections. The predetermined selections are realized through a workflow scheme.

In an embodiment, a workflow scheme includes information utilized to provision, manage, operate, monitor and configure protection services in the protection resources, and various network elements, available in the network 100. Such information may indicate, but is not limited to, operation regimens defining actions to be performed after provisioning as well as provisioning instructions, attributes required for performing the actions, triggering criteria for initiating or terminating operation regimens, resources for detecting trigger events, classifications of network and mitigation resources, and the like. Each set of triggering criterion may correspond to an initiation or termination of a particular operation regimen such that, upon satisfaction of the triggering criteria, the corresponding operation regimen is initiated or terminated.

In an embodiment, the workflow scheme may be further assigned to one or more protected entities in the network 100. In another embodiment, the workflow scheme may be subsequently reassigned to one or more protected entities in the network 100. Such assignment and reassignment allows each workflow scheme to be utilized for multiple protected entities at once or at different times, thereby allowing for increased flexibility via selective assignment of workflow schemes to protective resources based on, e.g., organizational or other network security needs.

In an embodiment, a workflow scheme includes at least one operation regimen to be activated upon a security service setup, during trigger fulfillments, or both. For example, the provisioning may include all activities needed to initiate a new security service, configuring a new policy or a mode on a mitigator, redirecting traffic to or from a mitigator, and so on. The operation regimen may be utilized to automatically configure one or more networks, network elements, protection components (e.g., any of the protection resources 160, 170, and/or 185), or a combination thereof, to perform actions defined in an operation regimen for detecting security threats, mitigating security threats, or both, with respect to a network topology.

In an embodiment, an operation regimen's action may be a mitigation and defined with attributes related to a policy to be utilized by a mitigator or a group of mitigators assigned to protect the protected entities. In another embodiment, an operation regimen's action may be diversion based on the attributes to traffic redirection through, for example, routers to issue BGP updates with, BGP ASN, BGP Community, VPN identifiers, and so on. In another embodiment, an operation regimen's action may be blocking and includes attributes related to blocking rules defined using, for example, BGP or BGP FlowSpec traffic signatures to block, BGP Communities, and so on.

Each triggering criterion is based on an internal or external trigger event utilized to determine when to initiate or terminate a particular operation regimen. Each trigger event may be further associated with one or more protection resource and trigger one or more operation regimens. Upon satisfaction of the triggering criteria for at least one operation regimen, actions defined in the operation regimen may be executed or terminated. Detailed discussion and examples for workflow schemes are provided below.

In an embodiment, the workflow scheme includes a provisioning direction set defining one or more default operation regimens to be activated upon an initial security service setup.

It should be noted that the embodiments disclosed herein are not limited to the specific architecture illustrated in FIG. 1, and that other architectures may be equally used without departing from the scope of the disclosed embodiments. Specifically, it should be emphasized that the disclosed embodiments are not limited to large-scale networks having multiple tiers as discussed above. In some configurations, such as networks controlled by BGP or BGP FlowSpec, the security control system 150 is directly connected to various network elements and protection resources.

Figure 2:
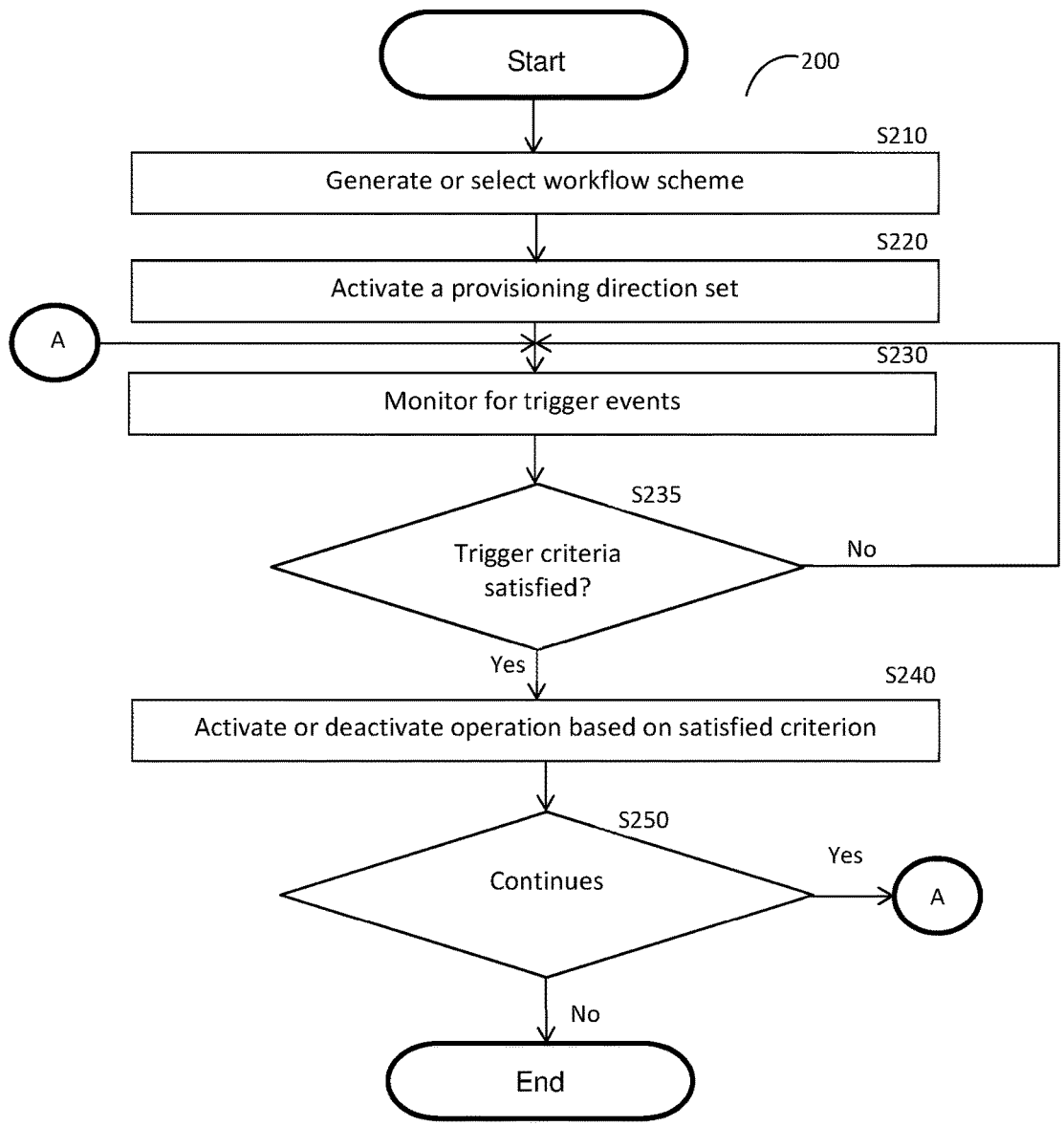
FIG. 2 is a flowchart describing a method for operating protection services in multi-tiered networks in multi-tiered cyber security networks according to an embodiment.

FIG. 2 is an example flowchart 200 illustrating a method for operating protection services in communication networks including protection resources according to an embodiment. In an example embodiment, the method may be performed by a centralized security control system in such a communication network (e.g., the centralized security control system 150 in the network 100). In another embodiment, other systems such as, but not limited to, a distributed management system, may be utilized. The method allows for providing flexible configurations and responses to possible cyber security threats based on predetermined selections.

At S210, a workflow scheme is generated. In an embodiment, the workflow scheme may be generated based on, e.g., user inputs, security needs of the specific service, or both. Generating the workflow scheme based on user inputs allows for, e.g., a customer to configure or build the workflow scheme as needed. In another embodiment, the workflow scheme may be selected from among a plurality of predetermined workflow scheme (i.e., "out of the box"

scheme). In yet another embodiment, the workflow scheme may be customized based on known security needs. In some embodiments, S210 includes selecting a workflow scheme from a list of predefined schemes.

The selected or generated workflow scheme may be further assigned to one or more protected entities in the network. In another embodiment, the workflow scheme may be subsequently reassigned to one or more protected entities in the network. Such assignment and reassignment allows each workflow scheme to be utilized for multiple protected entities at once or at different times, thereby allowing for increased flexibility and easier operations via selective assignment of workflow schemes to protective resources based on, e.g., organizational or other network security needs.

The workflow scheme includes all information utilized to provision, manage, operate, and configure protection services in the protection resources available in the network. Such information may indicate, but is not limited to, operation regimens defining actions to be performed after provisioning as well as provisioning instructions, triggering criteria for initiating or terminating operation regimens, resources for detecting trigger events, classifications of network and other entities to protect (ASN, BGP Community, FQDN, and such) and mitigation resources, and the like. Each set of triggering criteria may correspond to an initiation or termination of a particular operation regimen, or set of operation regimens such that, upon satisfaction of the set of triggering criteria, the corresponding operation regimen is initiated or terminated, in order to meet the security need as defined by the triggering criteria.

The operation regimens typically define one or more actions to be performed and groups of resources and relevant attributes required for performing these actions by, e.g., the security control system 150. In an embodiment, each operation regimen activates a security policy on a set of predefined protection resources, that may be based on a predefined template. Each operation regimen may include, but is not limited to, actions to be performed in response to a cyber security threat or any other network or security events or triggers, parameters for performing the actions, and the like. The actions may include activation of any security capabilities of components of the network such as, but not limited to, provisioning additional protection resources, such as detection resources, mitigation resources, or both. The mitigation actions may include, but are not limited to, mitigation actions such as, e.g., provisioning of the required protection resources with the required security polices, diverting or injecting traffic, blocking traffic to one or more protected entities, notifying a user of a potential cyber security threat (e.g. sending an email, a text message, end the like), a user-defined action, and the like. In a further embodiment, the actions may further include customized actions based on, for example, user inputs.

In an embodiment, an operation regimen typically includes relevant attributes needed by the security control system 150 to realize the required actions. For example, the actions may include mitigation, diversion, blocking, user-defined actions. Following are some examples for action's attributes. The diversion action' attributes may include BGP or BGP FlowSpec attributes, such as routers to issue BGP updates with, BGP ASN, BGP Community, Dirty/Clean VPN identifiers, and the like. The blocking action's attribute may include traffic signatures to be blocked, BGP Communities, and so on. The mitigation action may include the group of protection resources and the required polices, or temple, to provision on each group member.

The attributes may include parameters used to configure protection resources, to perform the actions defined in the operation regimen, and the like. The parameters may further indicate the protection resources to perform particular mitigation, or other, actions. In an example embodiment, the parameters may indicate groups of protection resources such as, but not limited to, mitigation groups i.e., a group of protection resources assigned to perform mitigation. In addition, the parameters can include the diversion group network elements (routers, switches, etc.) identifiers and relevant attributes. These attributes are needed for traffic diversion from the diversion group members to the specified protection resources. Another type of parameter can be injection attributes needed for injecting back clean traffic from protection resources to the protected entity. Blocking attributes, i.e., blocking group and blocking methods, can be specified when the relevant action is blocked. The mitigation, diversion, injection, and blocking attributes can be defined in reusable templates.

The provisioning direction set defines at least one default operation regimen to be activated upon an initial security service setup. The provisioning direction set may be utilized to automatically configure one or more network and protection resources to perform the mitigation actions defined in an operation regimen for detecting security threats, mitigating security threats, or both, with respect to a network topology. The operation regimen can define which security policy should be utilized by a mitigator. Such security policies can be defined in templates of the mitigator. That is, the provisioning can be related to protected entities, sub-networks, applications, links, and the like. In an embodiment, the provisioning direction set may be implemented as a default operation regimen utilized when no other operation regimen is being executed. In another embodiment, the provisioning direction set can be set at always on operation, for example, mitigation of attacks in an out-of-path manner.

Each triggering criterion is based on an internal or external trigger event utilized to determine when to initiate or terminate a particular operation regimen. Each trigger event may be further associated with a particular resource. For example, a trigger event may be detection of a bandwidth above 500 Gbps detected by a particular detector. In an embodiment, the triggering criteria for an operation regimen activation may be further based on a combination of trigger events.

In an embodiment, the triggering criteria may be based on alternative trigger events (i.e., if any of the trigger events occurs, the triggering criteria is satisfied), joint trigger events (i.e., the triggering criteria is satisfied only if two or more trigger events occur), alternative combinations of trigger events (i.e., the triggering criteria is satisfied if any particular combination of trigger events occurs). It should be noted that any other combinations for triggering event logical expressions, and their various properties, can be applied here as well.

Upon satisfaction of the triggering criteria for an operation regimen, actions defined in an associated operation regimen may be executed or terminated. A trigger event may represent any kind of event occurring in the network, e.g., the start or end of a cyberattack of a specific type. Types of trigger events may include, but are not limited to, receiving an inbound indication, a status change, an attack type, detection of suspicious traffic, a particular link in the network being saturated, and the like. Whether a criterion has been satisfied may be based on, but is not limited to, a type of trigger event detected, a severity of a detected trigger event, a traffic volume related to each detected trigger event, combinations thereof, and the like.

Example trigger events may include, but are not limited to, a security service provision start, a provision end, a start or end of an attack as determined by a particular detector, bandwidth of an attack (e.g., greater than, less than, or equal to a particular bandwidth value, or a combination thereof), a risk of an attack (e.g., low, medium, high, combinations thereof, etc.), a particular attack protocol (e.g., TCP, HTTP, IP), an attack type (Layer 3-4, Layer 7), a mitigator link bandwidth (e.g., greater than, less than, or equal to a particular bandwidth value, or a combination thereof), customized trigger events defined based on user inputs, a timer since startup/end of another operation, a timer since start/end of attack, a mitigation device health change, a router status change, a peace time traffic volume change, a predefined schedule (time of the day, a day of the week, etc.), executing pre-defined scripts, combinations thereof, and the like.

In an embodiment, triggering criteria, and their attributes, may be stored in a trigger table along with their corresponding operation regimen, provisioning direction set, or both. Each entry in the trigger table may indicate, but is not limited to, a start triggering criterion (when satisfied, triggers initiation of an operation regimen), an end triggering criterion (when satisfied, triggers termination of an operation regimen), or a corresponding operation regimen. In some embodiments, the criteria can be formatted as a set of logical expressions, such as "or", "and", "not", and the like, on a group of triggers. In an embodiment, the user can define whether the operation regimen can be automatically activated upon trigger satisfaction, or the user can have the ability to manually confirm the activation of an operation regimen when a trigger is satisfied.

It should be noted that a set of workflow schemes can be predetermined and applied to configure the protection resources automatically or on-demand. The main building blocks of a workflow scheme are operation regimens and triggering criteria. In an embodiment, predefined sets of operation regimens, triggering criteria, or both, are provided to create a new scheme or to modify an existing scheme. A workflow scheme can be utilized for provisioning, managing, monitoring, or operating the resources, or a combination thereof, to protect a plurality of protected entities. That is, one workflow scheme can be applied to many entities. Therefore, instead of provisioning and managing the resources for each protected entity separately (there are typically thousands of such entities in a large-scale network), one workflow scheme can be reused for hundreds of entities with similar protection attributes. This would simplify the provisioning and management of protection resources and network elements in the large-scale network.

It should be noted that all the generated workflow schemes are saved or accessible by the security control system. The security control system, when executing the disclosed method, can operate, and execute, the protection services based on the generated or selected workflow scheme.

Returning to FIG. 2, at optional S220, a provisioning direction set defining at least one default operation regimen is activated. The provisioning direction set is part of the generated workflow scheme. The provisioning direction set, when activated, can cause initial provisioning and operating of one or more of the protection resources, redirect traffic and such.

In an optional embodiment, S220 may include, but is not limited to, selecting appropriate protection resources based on, for example, capacity, load, security capabilities, or a combination thereof. The selection may further be based on monitoring of load and availability for each protection resource. Allocation of protection resources based on capacity, load, and security capabilities is described further herein below with respect to FIGS. 3 and 4.

At S230, protected entities, resources, or both, in the network are monitored for trigger events. The monitoring may include, but is not limited to, collecting cyber security metrics, signals, or both, from protection resources configured as detectors, collecting link load statuses from network elements, and the like. Specifically, the cyber security metrics may be collected from one or more of the detectors indicated in the workflow scheme. Based on the monitoring, it may be determined whether the triggering criteria for an operation regimen have been satisfied. As noted above, satisfaction of the triggering criteria may be based on types, severities, or volumes related to trigger events, or a combination thereof. It should be noted that determining if the triggering criteria is satisfied can be performed by the protection resource (e.g., a detector) configured with the triggering criteria or by the security control controller system that receives signals or metrics from the protection resources.

At S235, a check is made if the trigger events satisfy one or more of the triggering criteria. If so, execution returns to S240; otherwise, execution continues with S230.

At S240, upon satisfaction of the triggering criteria for an operation regimen, activation or deactivation of at least one corresponding operation regimen may be caused. The operation regimen to be executed or terminated may be determined based on the trigger list, listing at least the satisfied triggering criteria. In an embodiment, S240 may further include prompting a user for permission, or confirmation, to cause the operation regimen. In another embodiment, a notification may be sent to the user regarding the satisfaction of criteria for a particular operation regimen.

The activation of an operation regimen includes provisioning and operation of each protection resource defined in the regimen (e.g., defined in a mitigation group). As discussed above, the protection resources may include attack mitigators, detectors and various network elements, external protection resources in the cloud, or a combination thereof. The attack mitigators can be defined by a mitigation group defined in the operation regimen and are activated/configured when the action in the workflow is "mitigate". The network elements are defined by a blocking group and are configured to block traffic when the action in the workflow is set to "blocking". In an embodiment, the configuration of such network elements can be performed via protocols including, but not limited to, BGP, FlowSpec, OpenFlow, and the like, to modify forwarding tables, ACLs, and the like of such elements.

The detectors may include various entities that can signal an attack, a measurement of network activity, or both. For example, detectors may include the central control, an internal detector, an external detector, SIEM systems, mitigators that provide attack indication, WAF services, and user input (e.g., by a security operation team) that triggers an attack. In an embodiment, the triggering criteria can be based on aggregated inputs from multiple detectors, defined by the detector group, thereby considering each individual detector indicated in the group. For example, one detector from the group may consider the attack as terminated, but another detector may consider the attack as still on-going. In such a case, the aggregation considers the attack as still ongoing.

At S250, it is determined whether the method should end, and, if not, execution continues with S230; otherwise, execution terminates. In an embodiment, the method ends upon triggering of a service down event.

It should be appreciated that, using the disclosed method, a complete security service can be defined to defend the protected entities. Through the generation and utilization of workflow schemes, the entities to be protected are assigned and actions to secure such entities are defined. A protected entity assignment in a workflow scheme can be defined using, for example, a CIDR prefix, an IP address, a BGP Community, an ASN, a FQDN, a URI, E.164 field, and the like.

Figure 3:
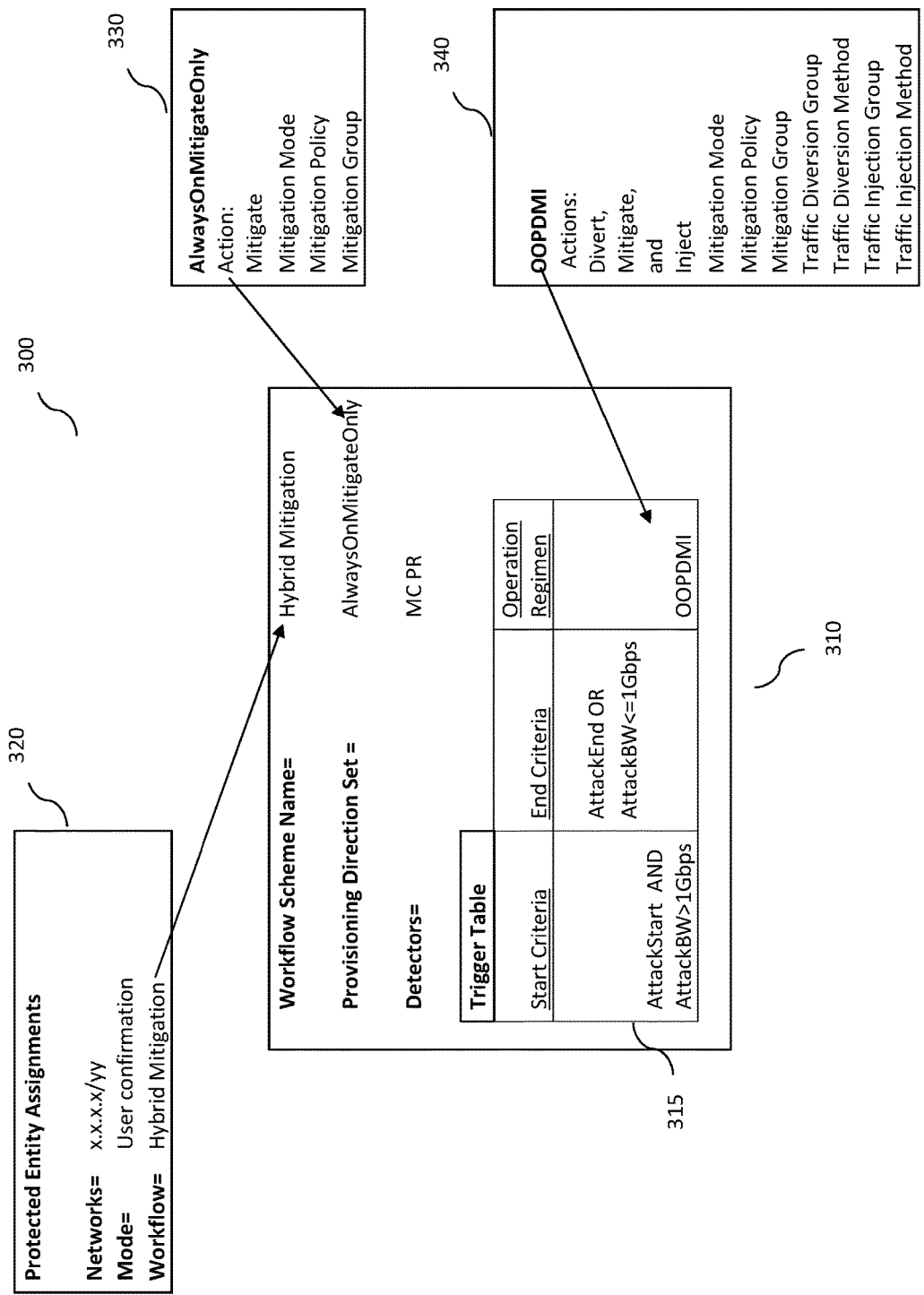
FIG. 3 illustrates a visual representation of a workflow scheme according to an example embodiment.

FIG. 3 is a visual representation 300 illustrating the entire operations needed for the provisioning of an anti-DDoS service using an example workflow scheme 310. The visual representation 300 includes a workflow scheme 310, a trigger table 315, operation regimen assignments 340, protected entity assignments 320, and a provisioning direction set 330. The workflow scheme illustrated in the visual representation 300 is a mitigation workflow "HybridMitigation." The protected entity assignments 320 include a single entity to be protected, identified by its network address.

The example provisioning direction set 330, "AlwaysOn-MitigateOnly," is an operation regimen indicating a group of protection resources assigned in the workflow to the protected entities, as well as attributes for provisioning, while no other operation regimen is being executed during the protection service setup time. Specifically, the provisioning direction set 330 indicates a mitigation action, a mitigation group (i.e., a group of protection resources assigned to perform mitigation according to a mitigation mode), and a mitigation policy defining attributes for mitigation.

The detectors to be utilized by the scheme 310 include a medium capacity protection resource.

The trigger table 315 indicates a start triggering criterion "AttackStart AND AttackBW>1 Gbps" (detected attack bandwidth is more than 1 Gbps, aggregated by the specified detectors or by specific detector) and an end triggering criterion "AttackEnd OR AttackBW<1 G" (attack is ended). The operation regimen 340 to be initiated and terminated by the start triggering criterion and the end triggering criterion, respectively, is OutOfPathDivertMitigateInject ("OOP-DMI"). The operation regimen 340 includes various actions and attributes. The OOPDMI operation regimen 340 will divert traffic (including attack traffic) to a scrubbing center, defined by the specified "mitigation group", the assigned protection resources. It is to be noted that, upon detection of an attack with a bandwidth less then 1 Gbps, the triggering criterion is not satisfied and, therefore, no action will be taken. Thus, when no attack having a bandwidth greater than 1 Gbps has been detected, the provisioning direction set 330 activated during the service provisioning (AlwaysOnMitigateOnly) remains active.

Thus, the OOPDMI operation regimen 340 is initiated when the bandwidth of an attack is greater than 1 Gbps and terminates once the attack traffic ends or bandwidth drops <1 G. In an example embodiment, the OOPDMI operation regimen 340 may further indicate actions related to mitigation, diversion, and injection, as well as any required parameters or attributes needed for the actual activation of these actions.

Figure 4:
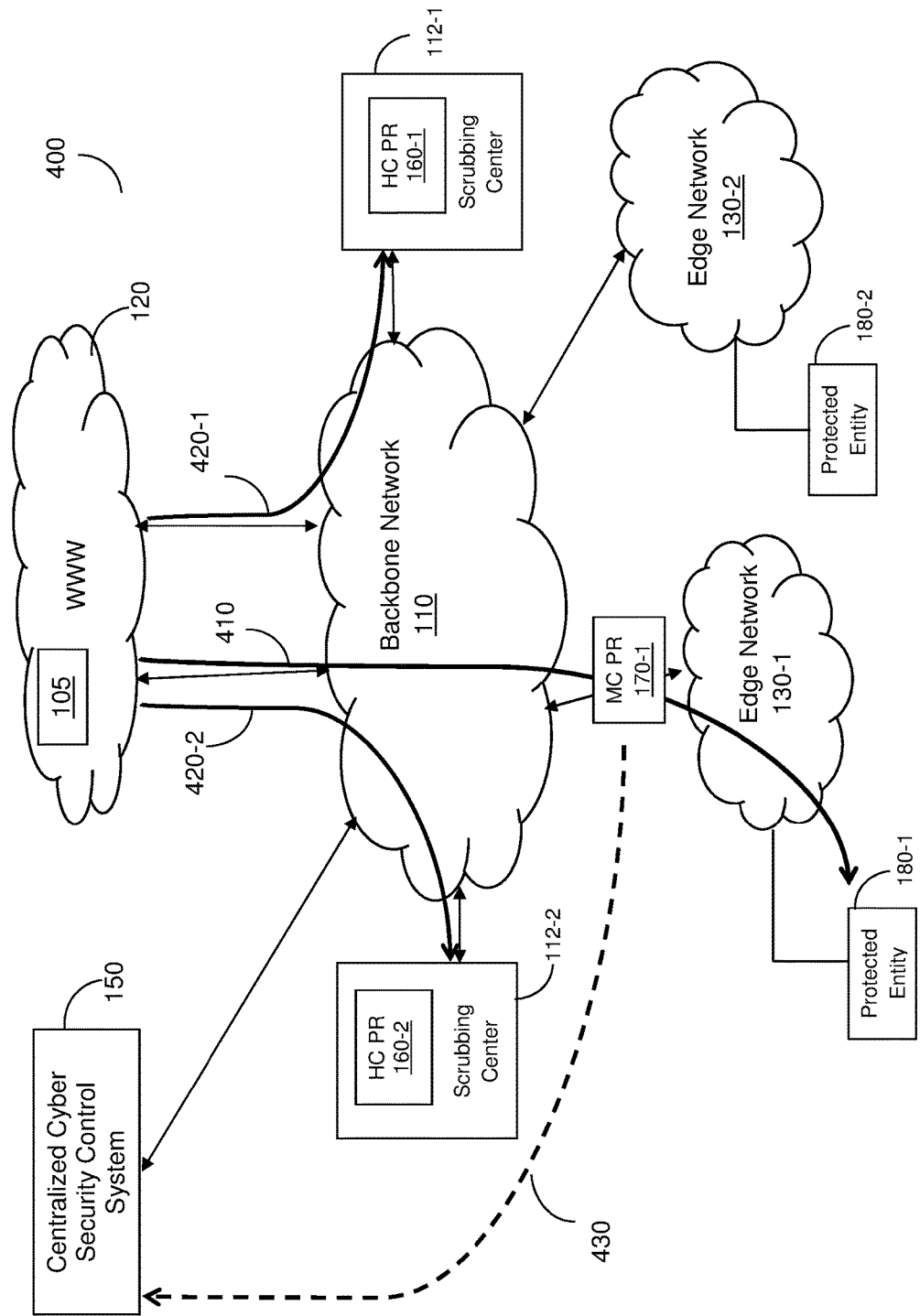
FIG. 4 illustrates a communication network for demonstrating an example for provisioning according to the workflow scheme of FIG. 3.

FIG. 4 illustrates an example diagram of a communication network 400 for demonstrating an example utilization of a workflow scheme according to the disclosed embodiments. In an embodiment, the communication network 400 is a large-scale network.

The various elements shown in FIG. 4 are discussed with reference to FIG. 1. Specifically, the network 400 includes elements illustrated in FIG. 1, and further includes two scrubbing centers 112-1 and 112-2 as well as two high capacity protection resources 160-1 and 160-2, respectively. The example of FIG. 4 is described with respect to the "Hybrid Mitigation" workflow scheme 310 discussed herein above with respect to FIG. 3, merely for simplicity purposes.

In the example network 400, after generation or selection of the Hybrid Mitigation workflow scheme of FIG. 3 and assigning the workflow to the protected entity 180-1, the medium capacity protection resource 170-1 is provisioned for receiving traffic 410 to the protected entity 180-1. The provisioning may include, but is not limited to, configuring the medium capacity protection resource (MC PR) 170-1 based on the provisioning direction set 330. The security control system 150 is configured to receive security metrics and/or events 430 related to the traffic 410, both legitimate and attack, from the medium capacity protection resource 170-1, and to monitor the security metrics, events, or both, to identify any trigger events.

Based on the monitoring, it may be determined that there is an active, or detected, attack and that bandwidth of the attack traffic is above 1 Gbps. Accordingly, the trigger events AttackStart and "AttackBW>1 Gbps" has occurred. Thus, the start triggering criteria for the OOPDMI operation regimen 340 have been met. Therefore, the security control system 150, through the activation of the OOPDMI operation regimen 340, causes the diversion of traffic 420-1 and 420-2 to the scrubbing centers 112-1 and 112-2. At the scrubbing centers 112-1 and 112-2, the high capacity protection resources 160-1 and 160-2 may clean the traffic 420-1 and 420-2, respectively, and may redirect legitimate traffic back to the protected entity 180-1. In an embodiment, the traffic diversion controlled by the security control system 150 is operated using BGP protocol based on various BGP attributes defined by OOPDMI operation regimen 340.

To this end, the security, or mitigation, state (i.e., information related to the security metrics such as the normal traffic baseline or the active security policy) may be copied and sent from the medium capacity protection resource 170-1 to the high capacity protection resources 160-1 and 160-2. Additionally, the high capacity protection resources 160-1 and 160-2 may be configured based on the operation regimen 340. When the attack has ended, the end triggering criteria for the termination of operation regimen may be satisfied and the operation regimen may be terminated. In this case, the system is returned to its initial condition as defined by the provisioning direction set 330. The mitigation states can be shared among various mitigators deployed in the network. In an embodiment, the active security, or mitigation state, can be retrieved from the high capacity protection resources 160-1 and 160-2 and configured back to the medium capacity protection resource 170-1.

Figure 5:
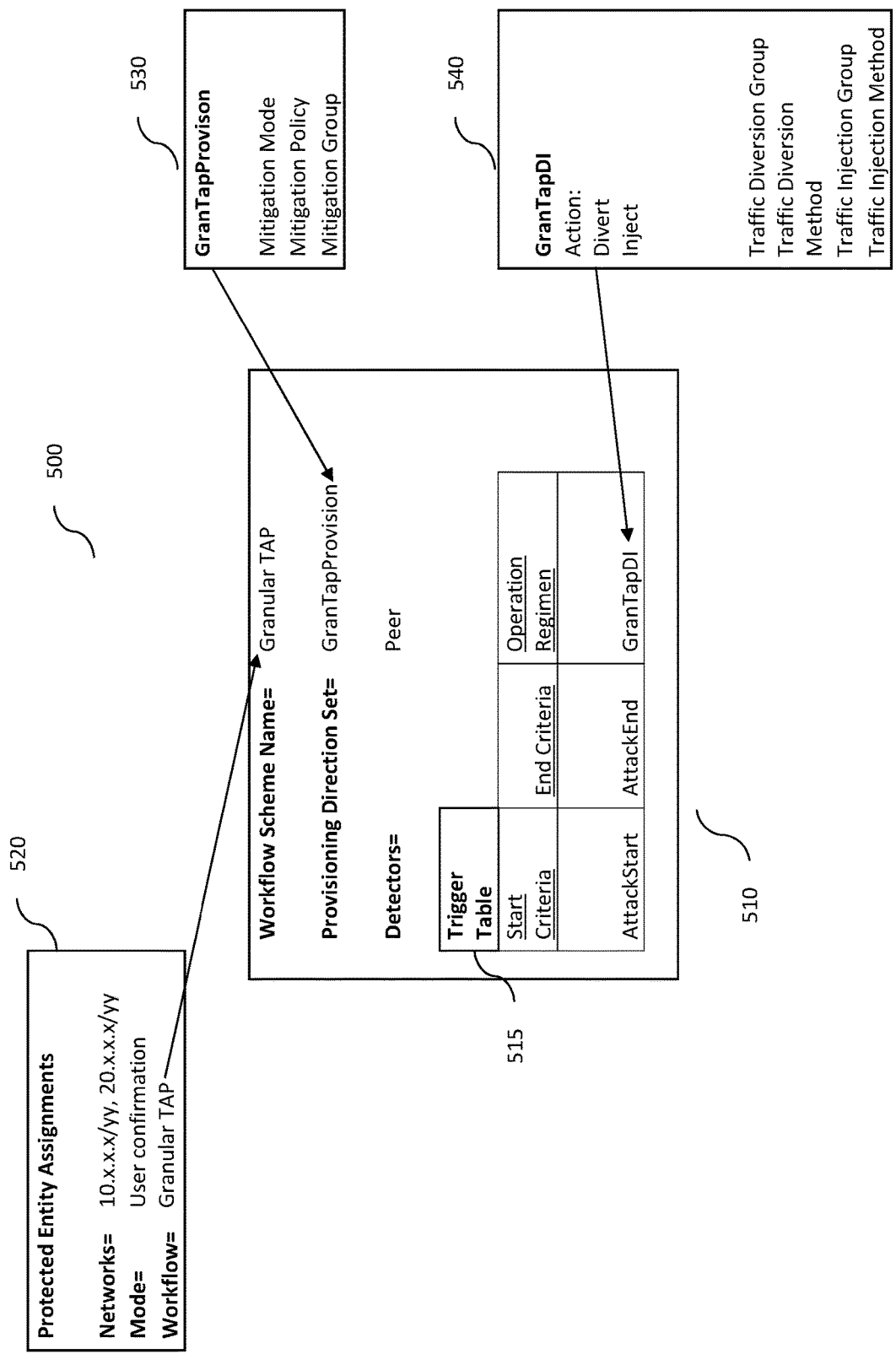
FIG. 5 illustrates a visual representation of an example workflow scheme.

FIG. 5 is a visual representation 500 illustrating the operation of a tapping security service using an example workflow scheme defined according to an embodiment. The visual representation 500 includes a workflow scheme 510, a trigger table 515, protected entity assignments 520, a provisioning direction set 530, and an operation regimen 540. The workflow scheme 510 illustrated in the visual representation 500 is a workflow "Granular TAP" in which a copy or TAP port receives a copy of all relevant traffic. The protected entity assignments 520 include two entities to be protected, identified by their respective network addresses. The example provisioning direction set 530, "GranTapProvision," is an operation regimen indicating a group of resources for detecting traffic and for diverting traffic to mitigators (i.e. realizing the actual copy or TAP various operations), as well as any policies or other settings for provisioning. In an embodiment, the TAP copy operations can be realized by the security control system 150 using BGP FlowSpec "copy" actions capabilities.

The trigger table 515 indicates a start triggering criterion, "AttackStart," and an end triggering criterion, "AttackEnd." The operation regimen 540 to be initiated and terminated by the start criterion and the end criterion, respectively, is GranularTapDivertInject ("GranTapDI"). Thus, the operation regimen 540 GranTapDI is initiated when a protection resource, here acting as a detector, determines that an attack has begun, and terminates once the attack traffic stops. The operation regimen 540 GranTapDI further includes actions and attributes. In an embodiment (not shown in FIG. 5), the actions can be redirect, inject, and running a pre-defined script for updating the router TAP configuration. The pre-defined script can be defined using an appropriate operation regimen action.

Figure 6:
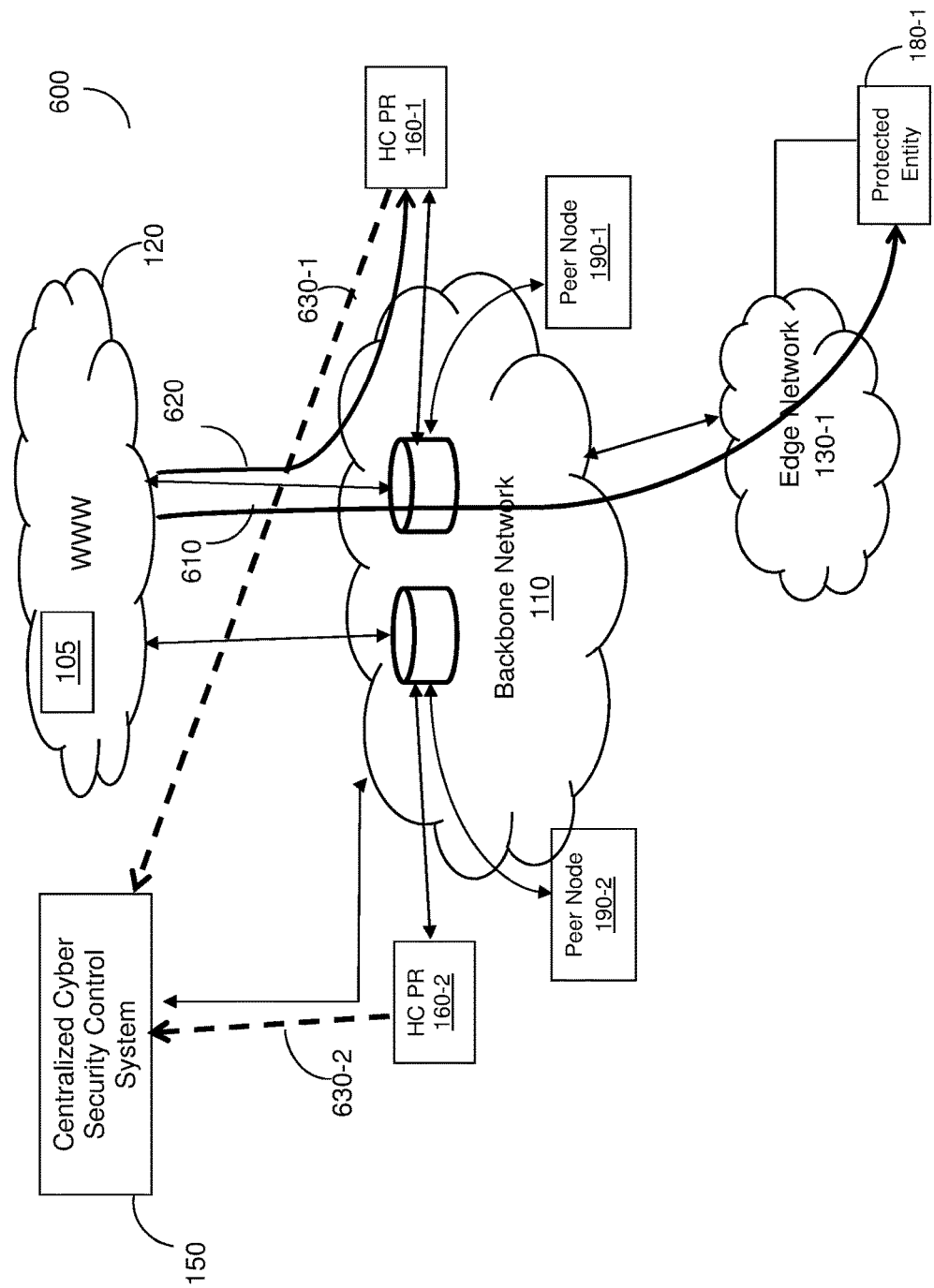
FIG. 6 illustrates a communication network for demonstrating an example for provisioning according to the workflow scheme of FIG. 5.

FIG. 6 illustrates an example diagram of a communication network 600 demonstrating an example utilization of a workflow scheme according to the disclosed embodiments. The various elements shown in FIG. 6 are discussed with reference to FIG. 1. Specifically, the network 600 includes elements of the network 100, but further includes two peer nodes of the backbone network 110. The example of FIG. 6 is described with respect to the "Granular TAP" workflow scheme 510 discussed herein above with respect to FIG. 5, merely for simplicity purposes.

In the example network 600, after generation or selection of the workflow "Granular TAP" scheme 510 and assignment of the workflow scheme 510 to the protected entity 180-1, the high capacity protection resource (HC PR) 160-1 is provisioned. The traffic 610 is sent to the protected entity 180-1 via the backbone network 110 and, in particular, the peer node 190-1. Each of the peer nodes 190-1 and 190-2 includes a TAP port for sending copies of the traffic flows to the respective high capacity protection resource 160-1. The copied traffic may be sent based on the definitions in provisioning direction set 530.

When an attack is detected based on the security metrics or events 630-1 and 630-2 (thereby satisfying the start triggering criteria for the operation regimen "GranTapDI" 540), the security control system 150 causes a portion 620 of the traffic 610 being addressed only to the protected entity 180-1 to be diverted to the high capacity protection resource 160-1, instead of being sent directly to protected entity 180-1 as is normally done during peace time. In an embodiment, the traffic diversion is performed using BGP FlowSpec based on the traffic diversion method attributes defined by operation regimen 540. When the attack ends (thereby satisfying the end triggering criteria for the operation regimen), the operation regimen of provisioning direction set 530 resumes and clean traffic is sent directly to the protected entity 180-1, along with the TAP of traffic. During the attack, the high capacity protection resource 160-1 produces clean traffic being injected back to the network and forwarded to the protected entity 180-1.

Figure 7:
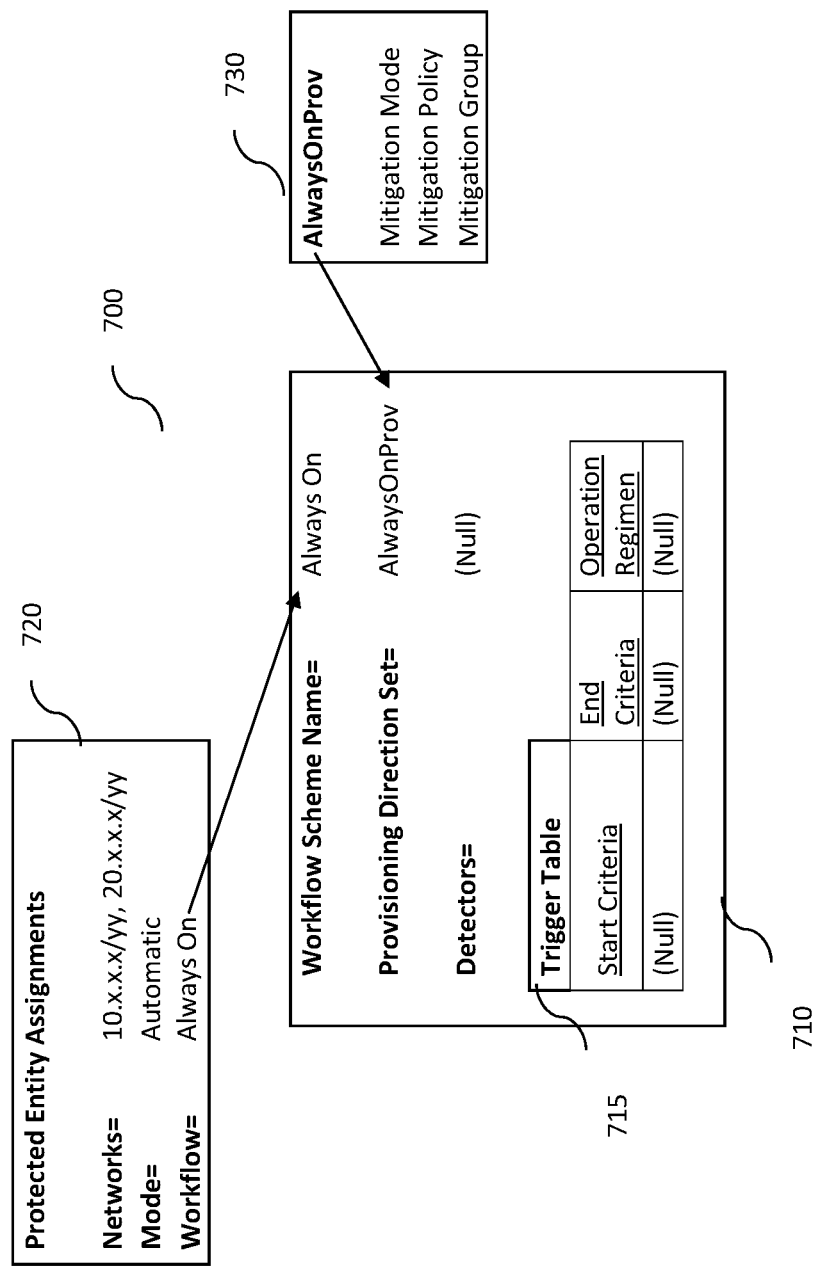
FIG. 7 illustrates a visual representation of an example workflow scheme.

FIG. 7 is a visual representation 700 illustrating an operation of a mitigation security service using another example workflow scheme. The visual representation 710 includes a workflow scheme 710, a trigger table 715, protected entity assignments 720, and a provisioning direction set 730. The workflow scheme 710 illustrated in the visual representation 700 is a mitigation workflow "Always On" in which the mitigating resource is always active. The protected entity assignments 720 include two entities to be protected, identified by their respective network addresses. The example provisioning direction set 730 "AlwaysOnProv" is an operation regimen indicating a group of resources for mitigating attacks as well as any policies or other settings for provisioning. There are no detectors identified in the workflow scheme.

The trigger table 715 includes null values for the start triggering criteria, end triggering criteria, and operation regimens. The mitigating resource remains active regardless of traffic at any particular time.

Figure 8:
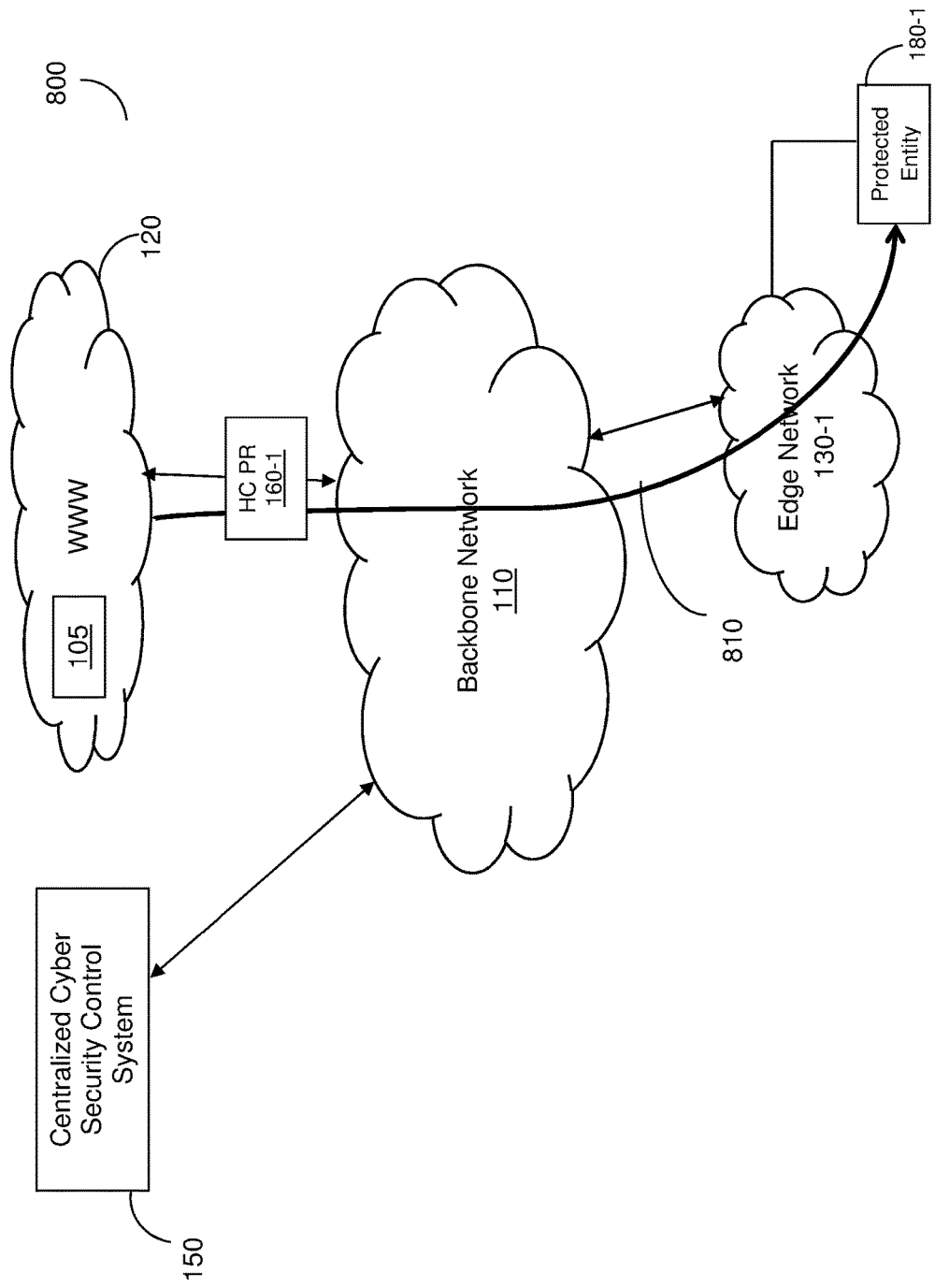
FIG. 8 illustrates a communication network for demonstrating an example for provisioning according to the workflow scheme of FIG. 7.

FIG. 8 illustrates an example diagram of a communication network 800 for demonstrating an example utilization of a workflow scheme according to the disclosed embodiments. The various elements shown in FIG. 8 are discussed with reference to FIG. 1. The example of FIG. 8 is described with respect to the workflow discussed herein above with respect to FIG. 7, merely for simplicity purposes.

In the example network 800, after generation or selection of the workflow scheme 710 "AlwaysOn" and assignment of the workflow scheme to the protected entity 180-1, the high capacity protection resource (HR PR) 160-1 is provisioned for receiving traffic 810 to the protected entity 180-1 according to the provisioning direction set 730. The high capacity protection resource 160-1 mitigates the traffic 810 as appropriate.

Figure 9:
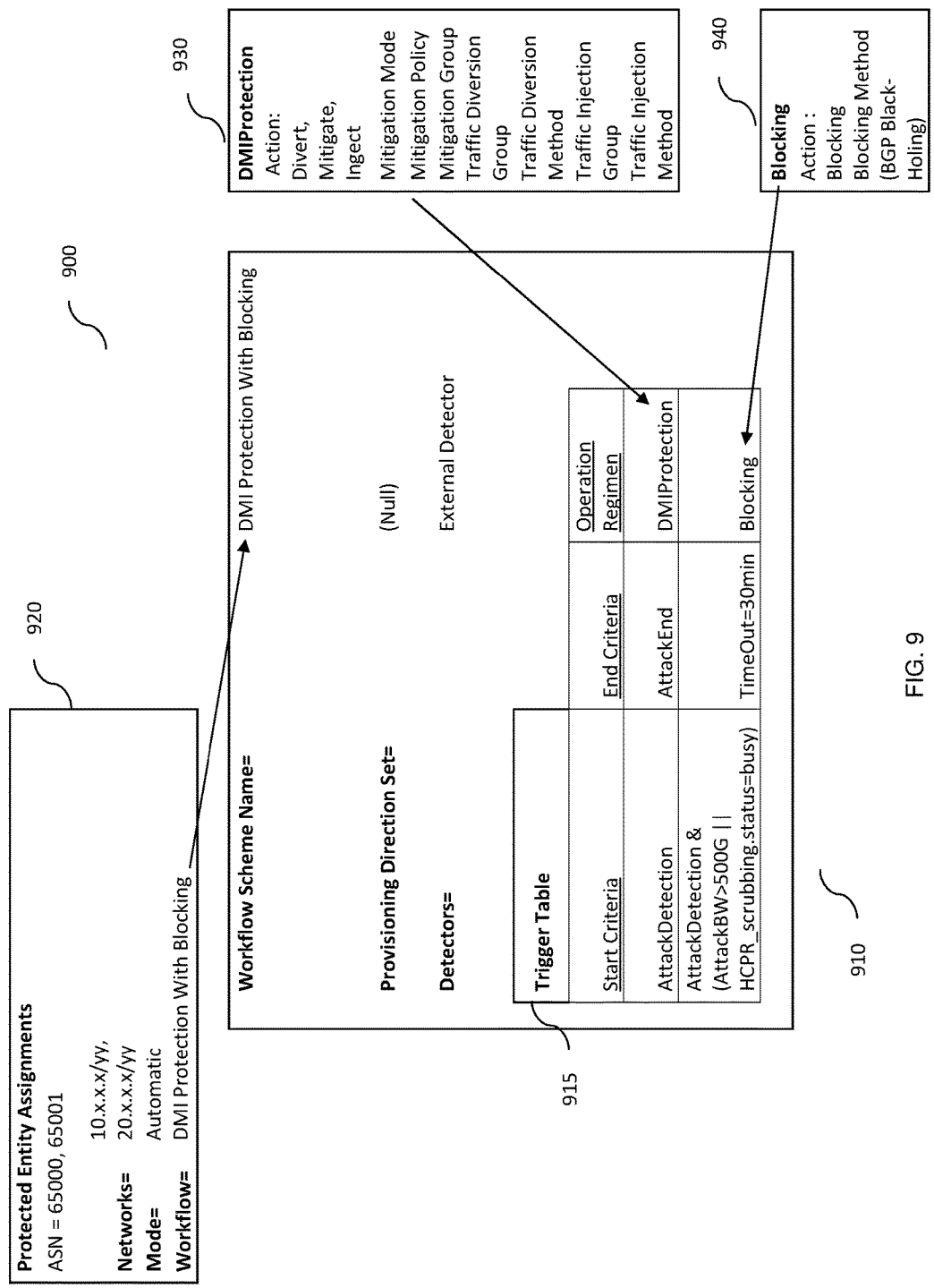
FIG. 9 illustrates a visual representation of another example workflow scheme.

FIG. 9 is a visual representation 900 illustrating an example workflow scheme. The visual representation 900 includes a workflow scheme 910, a trigger table 915, protected entity assignments 920, a first operation regimen 930, and a second operation regimen 940. The workflow scheme named "DMI Protection With Blocking" illustrated in the visual representation 900 relates to diverting, mitigating, injecting, or blocking traffic, or a combination thereof. The protected entity assignments 920 include two entities to be protected, identified by their respective network addresses, and also two ASNs. No provisioning direction set or other provisioning operation regimen is defined for this workflow. The detectors include an external detector system.

The trigger table 915 indicates a first start criterion, "AttackDetection," and an associated first end criterion, "AttackEnd." The operation regimen 930 to be initiated and terminated by the first start criterion and the first end criterion, respectively, is "DMIProtection." Thus, the operation regimen 930 DMIProtection is initiated when an attack has been detected and terminates once the attack traffic stops. In an example embodiment, the operation regimen 930 DMIProtection may further indicate actions related to diversion, mitigation, and injection of traffic, as well as any required parameters.

The trigger table 910 also indicates second start criteria, "AttackDetection and (AttackBW>500 Gbps or HCPR_scrubbing.status=busy)," and an associated second end criteria TimeOut=30 min. In the example, the trigger criteria are defined using logical expressions. The operation regimen 940 to be initiated and terminated by the second start criteria and the second end criterion, respectively, is for "Blocking." Thus, the operation regimen 940 "Blocking" is initiated when an attack has been detected and either the bandwidth of the attack is above 500 Gbps or a high capacity protection resource has a busy status. The operation regimen 940 Blocking is terminated 30 minutes after initiation as identified by a timer variable. In an example embodiment, the operation regimen 940 Blocking includes a blocking action, to block attacked protected entity traffic, as well as any related parameters. In an embodiment, the blocking action is achieved using BGP Black-Holing techniques.

Figure 10:
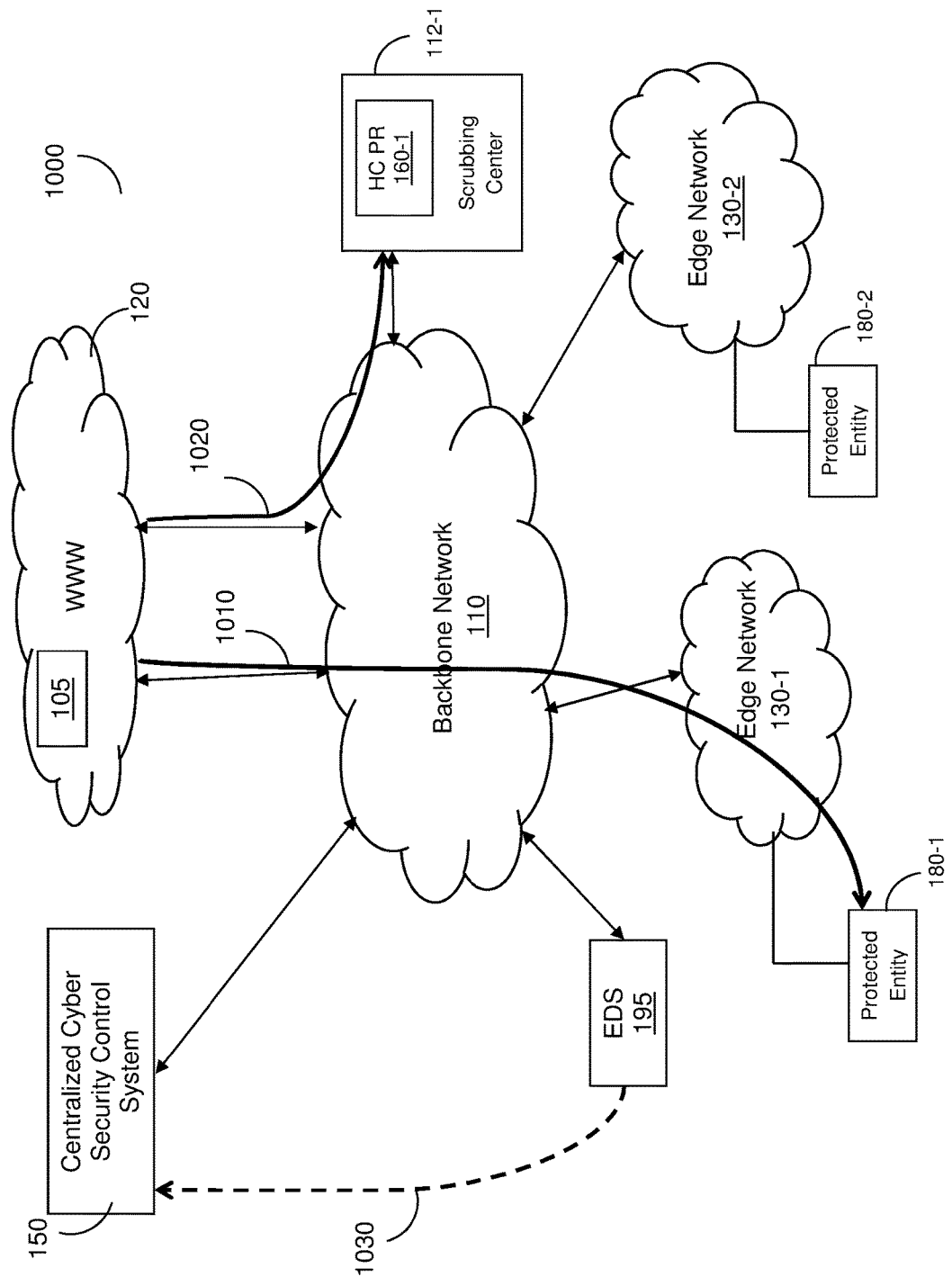
FIG. 10 illustrates a communication network for demonstrating an example for provisioning according to the workflow scheme of FIG. 9.

FIG. 10 illustrates an example diagram of a communication network 1000 for demonstrating an example utilization of a workflow scheme according to the disclosed embodiments. The various elements shown in FIG. 10 are discussed with reference to FIG. 1. Specifically, the communication network 100 includes elements of the network 100, but further includes an external detector system (EDS) 195. The example of FIG. 10 is described with respect to the workflow discussed herein above with respect to FIG. 9, merely for simplicity purposes.

In the example network 1000, after generation or selection of the "DMI Protection With Blocking" workflow scheme 910 of FIG. 9 and assigning the workflow scheme to the protected entity 180-1, the security control system 150 receives security metrics 1030-1 and 1030-2 from the EDS 195 respectively, and monitors the security metrics to identify any trigger events.

Based on the monitoring, it may be determined that the traffic 1010 includes attack traffic, thereby resulting in a detection of an attack. If the bandwidth of the attack is not above 500 Gbps and the status of the high capacity protection resource 160-1 in the scrubbing center 112-1 is not busy, then the start criteria for the "DMIProtection" operation regimen are satisfied, and the security control system 150 causes the traffic 1010 to be redirected as traffic 1020 to the scrubbing center 112-1 until it is determined that the attack has ended. Otherwise (i.e., the bandwidth is above 500 Gbps or the high capacity protection resource 160-1 is busy), the security control system 150 causes the traffic to be blocked for 30 minutes.

In an embodiment, all of the above exemplary and non-limiting workflow schemes are preconfigured with the centralized cyber system 150. In a further embodiment, the user (e.g., system administrator) is merely required to assign a selected workflow scheme to each entity to be protected. In yet a further embodiment, the provisioning of the various resources and the activation and execution of the workflow schemes do not require manual intervention or confirmation.

It should be noted that the embodiments disclosed herein are described with respect to particular network architectures merely for example purposes and for simplicity. The disclosed embodiments may be equally applied to any number of distinct network architectures without departing from the scope of the disclosure.

It should be noted that the embodiments described herein above with respect to FIGS. 7-10 are discussed with respect to a single operation regimen having one start triggering criterion and one end triggering criterion merely for simplicity purposes and without limitation on any of the disclosed embodiments. Multiple operation regimens, each having multiple start and/or end triggering criteria, may be included in a workflow scheme without departing from the scope of the disclosure.

It should be further noted that the embodiments described herein with respect to FIGS. 7-10 are merely examples and do not limit the disclosure. It should be further noted that provisioning direction sets may be implemented as operation regimens or as portions thereof without departing from the scope of the disclosure.

As can be understood from the examples provided below, the number of configurations of the protection resources (e.g., resources 160, 170 and 185), and the network elements are almost endless. Each such resource or element can be configured different to detect mitigate a protected entity, or both. The number of protected entities, and their types, in a communication network, such as a large-scale network is typically in the thousands. For example, one mitigation technique for one protected entity would be traffic diversion, while for the other it would be blocking traffic. Each such technique would require configuring the network elements, the detectors, the mitigators (protection resources), or a combination thereof. Further, the configuration should be modified in real time, e.g., as cyber-attacks are started or ended. The disclosed embodiments provide a solution for automated and dynamic performed the entire life-cycles of security operations in large-scale networks. The security operations include, in part, automated provisioning of the network elements and/or protection resources and monitoring the network throughout an execution of a security workflow, mitigating the attack, back to normal after the attack concluded, and so on.

Figure 11:
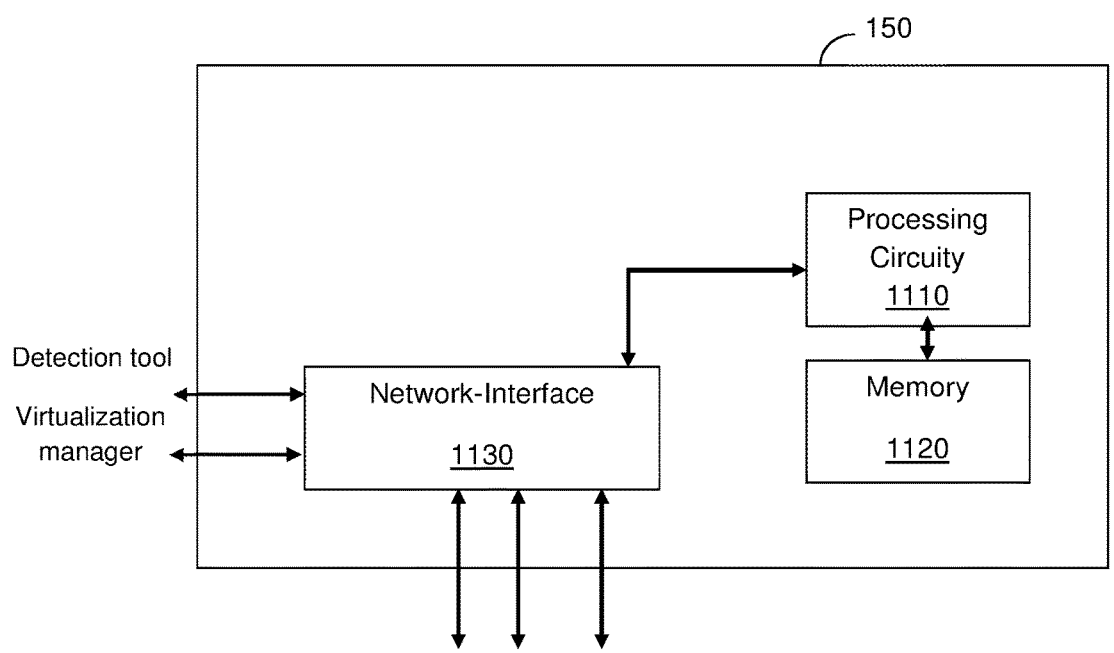
FIG. 11 is a block diagram of security control system realized according to an embodiment.

FIG. 11 shows an example block diagram of the centralized security control system 150 constructed according to an embodiment. The centralized security control system 150 includes a processing circuity 1110 coupled to a memory 1120, and a network interface 1130.

The network interface 1130 is configured to allow the communication with the protection resources and the protected entities in the various tiers of the network (e.g., the network 100). The network interface 1130 is configured to allow the communication with an external management system and/or a central controller, such as but not limited to, a SDN, BGP, BGP FlowSpec, and the like.

The processing circuity 1110 may comprise, or be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing circuity 1110 may also include machine-readable media for storing software. Software should be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing unit, cause the processing unit to perform the various functions.

The memory 1120 may comprise volatile and/or non-volatile memory components, including, but not limited to, static random access memory (SRAM), dynamic random access memory (SRAM), Flash memory, magnetic memory, and other tangible media on which data and/or instructions may be stored. The memory 1120 may contain instructions that, when executed by the processing circuity 1110, performs, for example and without limitations, the processes for performing cross tiers mitigation of cyber-attacks as described in more detail in above. The memory 1120 may also include one or more of a list of protection resources, protected entities, workflow schemes, and so on.

The various embodiments discussed herein can be implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the disclosed embodiments and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for operating protection services to provide defense against cyber-attacks, comprising:
   generating a workflow scheme assigned to at least one protected entity, wherein the workflow scheme includes at least one operation regimen and triggering criteria associated with the at least one operation regimen, wherein the at least one operation regimen defines a security policy for determining the at least one protection resource and a set of actions with which to provision the at least one protection resource;
   monitoring at least a plurality of protection resources to detect at least one trigger event;
   determining if the at least one detected trigger event satisfies the triggering criteria associated with the at least one operation regimen; and
   changing a state of the at least one operation regimen when the at least one detected trigger event satisfies the at least one triggering criterion, and causing provisioning and operating of at least one protection resource of the plurality of protection resources, wherein the provisioning is based on contents defined in the at least one operation regimen.

2. The method of claim 1, wherein changing the state of the at least one operation regimen further comprises any one of: activating the at least one operation regimen and deactivating the at least one operation regimen.

3. The method of claim 1, wherein the at least operation regimen further defines a set of attributes with which to provision the at least one protection resource.

4. The method of claim 3, wherein activating the at least one operation regimen further comprises:
   configuring the at least one protection resource based on the defined sets of actions and attributes.

5. The method of claim 3, wherein each of the actions is any one of: a mitigation action, a traffic diversion action, a traffic injection, a blocking action, an alert generation, and a user-defined action.

6. The method of claim 3, wherein terminating the operation regimen further comprises:
   provisioning the at least one protection resource to stop performing the actions defined by the at least one operation regimen.

7. The method of claim 2, further comprising:
   activating the least one operation regimen when the detected trigger event satisfies a start criterion; and
   deactivating the least one operation regimen when the detected trigger event satisfies an end criterion.

8. The method of claim 1, wherein the workflow scheme further comprises:
   a provisioning direction set defining at least a default operation regimen, wherein the at least one protection resource is initially provisioned during a service setup based on the provisioning direction set.

9. The method of claim 1, wherein each of the plurality of protection resources is any one of: a mitigation device, a detection device, and a network element.

10. The method of claim 1, further comprising:
    selecting the workflow scheme from a plurality of pre-generated workflow schemes.

11. The method of claim 1, further comprising:
    reusing the generated workflow scheme across different protected entities.

12. The method of claim 1, wherein the cyber-attack includes any one of: a denial of service (DoS) attack and a distributed DoS (DDoS) attack.

13. The method of claim 1, wherein the at least one protected entity is deployed in a multi-tiered communication network including a plurality of defense tiers.

14. The method of claim 13, wherein each defense tier in the multi-tiered communication network includes a subset of the plurality of protection resources having capacity and security capabilities set according to the respective tier.

15. The method of claim 1, wherein the triggering criteria is defined at least using a logical expression, wherein the logical expression defines the at least one triggering criterion through logical operators.

16. The method of claim 15, wherein the at least one triggering criterion includes at least a start triggering criterion for activating an operation regimen and an end triggering criterion for deactivating activating an operation regimen.

17. The method of claim 15, wherein satisfaction of the at least one triggering criterion is based on at least one of: a type of trigger event, a severity of trigger event, a type of attack, a predefined schedule, a bandwidth of the attack, a start of an attack, an end of an attack, a risk of an attack, a particular attack protocol, a timer for timing events, and a user-customized event.

18. The method of claim 15, wherein the logical expression enables customizing the workflow scheme to meet a certain type of cyber-attack.

19. The method of claim 1, wherein the workflow scheme allows for operation of a complete security service to protect the at least one protected entity through a lifecycle of an attack.

20. A non-transitory computer readable medium having stored thereon instructions for causing processing circuity to execute a process for operating protection services to provide defense against cyber-attacks, the process comprising:
    generating a workflow scheme assigned to at least one protected entity, wherein the workflow scheme includes at least one operation regimen and triggering criteria associated with the at least one operation regimen, wherein the at least one operation regimen defines a security policy for determining the at least one protection resource and a set of actions with which to provision the at least one protection resource;

monitoring at least a plurality of protection resources to detect at least one trigger event;

determining if the at least one detected trigger event satisfies the triggering criteria associated with the at least one operation regimen; and changing a state of the at least one operation regimen when the at least one detected trigger event satisfies the at least one triggering criterion, and causing provisioning and operating of at least one protection resource of the plurality of protection resources, wherein the provisioning is based on contents defined in the at least one operation regimen.

21. A system for operating protection services to provide defense against cyber-attacks, comprising:

a processing circuity; and a memory, the memory containing instructions that, when executed by the processing circuity, configure the system to:

generate a workflow scheme assigned to at least one protected entity, wherein the workflow scheme includes at least one operation regimen and triggering criteria associated with the at least one operation regimen, wherein the at least one operation regimen defines a security policy for determining the at least one protection resource and a set of actions with which to provision the at least one protection resource;

monitor at least a plurality of protection resources to detect at least one trigger event;

determine if the at least one detected trigger event satisfies the triggering criteria associated with the at least one operation regimen; and change a state of the at least one operation regimen when the at least one detected trigger event satisfies the at least one triggering criterion, and causing provisioning and operating of at least one protection resource of the plurality of protection resources, wherein the provisioning is based on contents defined in the at least one operation regimen.

* * * * *